United States Patent

[11] 3,580,533

| [72] | Inventor | George W. Nordland<br>8800 S. Harlam, Lot 119, Oak Lawn, Ill. 60455 |
|---|---|---|
| [21] | Appl. No. | 814,273 |
| [22] | Filed | Apr. 8, 1969 |
| [45] | Patented | May 25, 1971 |

[54] GOLF CART BAG SECUREMENT APPARATUS
5 Claims, 5 Drawing Figs.

[52] U.S. Cl. .................................................. 248/96, 280/47.26
[51] Int. Cl. ...................................................... A63b 55/08
[50] Field of Search........................................... 248/96, 154; 150/1.5 (B); 47.26,36 280/(W,G,C,C),

[56] References Cited
UNITED STATES PATENTS

| 1,978,242 | 10/1934 | Zack | 248/96 |
| 2,751,176 | 6/1956 | Mowry | 248/96 |
| 2,854,244 | 9/1958 | Jarman | 248/96 |
| 3,051,505 | 8/1962 | Flanagan | 280/47.26 |

Primary Examiner—Chancellor E. Harris
Attorney—Petherbridge, O'Neill and Lindgren ABSTRACT: An apparatus for removably connecting a golf bag to a golf cart. The apparatus includes a bag supporting base portion on the frame of the cart which serves to removably retain a loop member connected near the bottom of a golf bag in a recess formed in the base portion and a locking device having an element connected near the upper end of the golf bag which is cooperable with an element on the cart frame to permit the ready removal of the bag from the cart.

Patented May 25, 1971
3,580,533
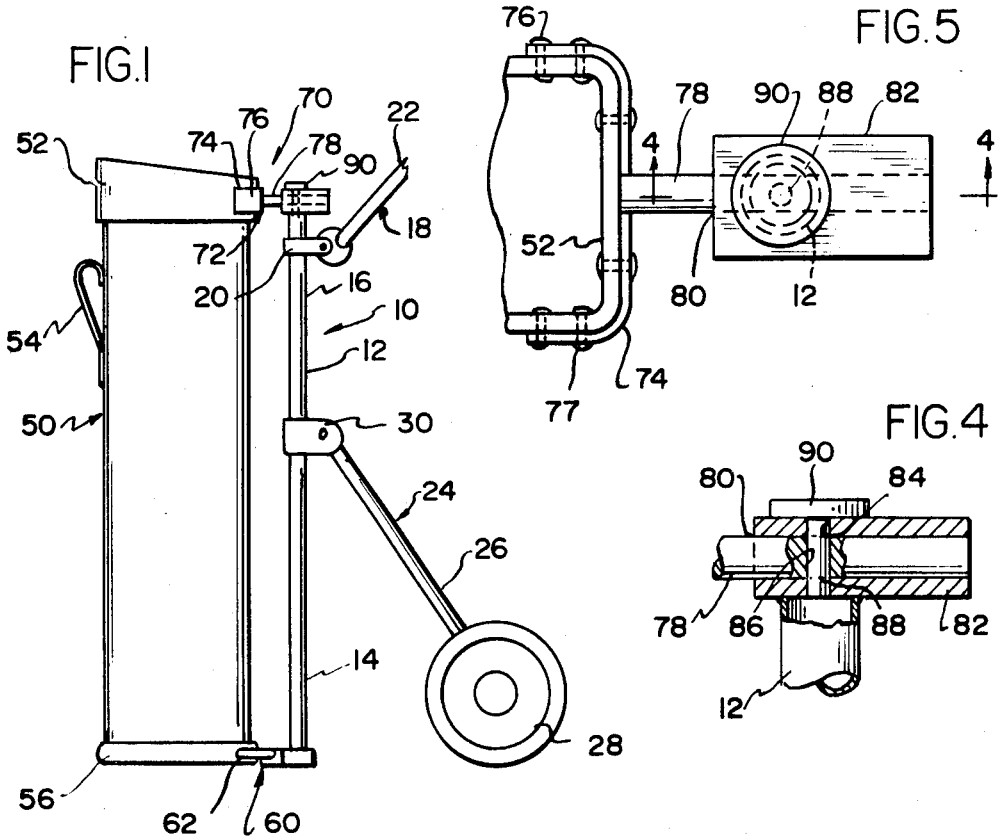
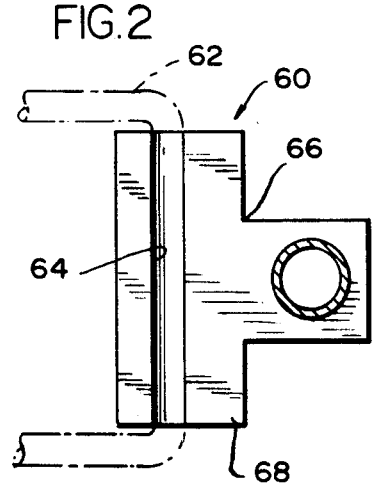
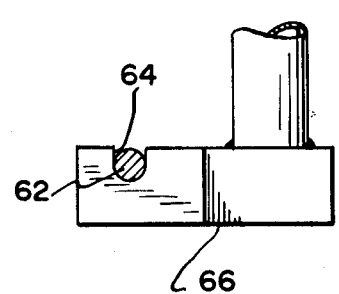
INVENTOR.
GEORGE W. NORDLAND
BY Petherbridge, O'Neill & Aubel
ATTORNEYS.

GOLF CART BAG SECUREMENT APPARATUS

This invention relates to an apparatus which is designed to facilitate the attachment of a golf bag to a golf cart in a manner such that the golf bag is maintained in an essentially stable position with respect to the cart during the use thereof. In the use of the connecting or bag securement apparatus of the invention, a bag, once attached to a cart, is inhibited from substantial movement relative to the golf cart.

Golf carts, once considered a luxury item for the affluent golfers, have now become a standard requirement for almost all golfers. While it is recognized that there are a wide variety of golf carts available to the golfing fraternity, many have a number of shortcomings. In particular, a common shortcoming of available golf carts resides in the number and size of appurtenances projecting from, hanging from or otherwise attached to the frame structure of the cart to facilitate golf bag attachment to the frame of the cart in a manner whereby it will not readily become disconnected from the cart through excessive movement. These appurtenances have taken various forms such as arms, other types of appendages of many varying shapes, straps, buckles, cradles, basket-type frames, etc. Such appurtenances generally are not a problem when the cart is in use on a golf course other than involving relatively complicated and unwieldy means for connecting the bag to the cart. However, when it becomes necessary to separate the golf bag from the cart for purposes of storage or transport, such as the placement of the cart in the confined area of an automobile trunk, the ordinary golf cart appurtenances frequently require a greater storage area than is available. This is equally true, of course, in cases of long term storage such as the storage of the golf cart over the winter months. In such circumstances, it is desired to have the most compact and least bulky unit available.

The bag attachment apparatus of the invention is designed to overcome the above shortcomings. Since the basic golf cart ordinarily consists of an elongated tubular frame member to which a collapsible wheel assembly is connected as well as a tubular foldable or collapsible steering arm, the attachment apparatus of the invention will add only a very minor amount of structure to this basic golf cart assembly. The attachment apparatus includes a projecting element which has a stem portion designed to be removably inserted into an aperture in the cart frame adjacent an end thereof. The projecting element is designed to be connected to a golf bag adjacent an end thereof and in a manner permitting stem insertion into the frame aperture. The opposite end of the golf cart frame is provided with a base member which is formed with an outwardly opening recess. The base member is designed to receive and retain a segment of a loop member, which is secured adjacent an end of the golf bag opposite that of the point of securement of the projecting element in the recess thereof.

Therefore, by providing a golf bag with a type of projecting element, preferably connected adjacent the top opening of the bag, and a loop member, preferably connected to the bag adjacent the bottom of the bag, the bag may be simply, quickly and rigidly secured to or disconnected from the golf cart frame. When in use on the frame of the golf cart, the bag is substantially inhibited from movement which would make the cart difficult to handle or would result in the disconnecting of the bag from the cart. When the bag has been disconnected and removed from the frame, the wheels of the cart can be collapsed in the usual manner and the steering arm of the cart can be folded down in the usual manner. The cart can then be stored as required without concern for the relatively inconsequential appurtenances provided on the cart frame for the securement of the golf bag thereto.

Various other objects and advantages of the invention will hereinafter become more fully apparent from the following description of the drawings illustrating presently preferred embodiments thereof and wherein:

FIG. 1 is a side elevation of a golf cart and bag combination, illustrating the securement apparatus of the invention;

FIG. 2 is a fragmentary plan view in partial section illustrating the base and loop members of the securement apparatus of the invention;

FIG. 3 is a fragmentary side elevation of the base member shown in FIG. 2;

FIG. 4 is a fragmentary side elevation, in partial section, illustrating the projecting element and means for removably securing the element to the top portion of the cart frame; and FIG. 5 is a top plan view of the structure illustrated in FIG. 4.

Referring now to FIG. 1, a conventional golf cart, generally designated 10, is shown. This conventional golf cart includes an upright, elongated tubular frame 12 provided with a bottom portion 14 and a top portion 16. The top portion 16 of the tubular cart frame 12 is provided with a steering handle mechanism, generally designated 18. This mechanism includes a yoke or C-clamp type structure 20, clamped to top portion 16 of the cart frame and to which is pivotally mounted the steering handle 22.

A collapsible wheel assembly, generally designated 24, is secured to the tubular frame 12 approximately midway between the ends thereof. As in the case of most conventional golf carts, the collapsible wheel assembly 24 consists of a pair of generally diagonally diverging legs 26 (only one being visible in FIG. 1), to which are rotatably mounted wheels 28. The diverging legs 26 of the wheel assembly 24 are pivotally connected to a bracket 30 in use. In conventional golf cart wheel assemblies, the bracket or leg pivot device is secured to the frame in a manner permitting the legs to be pivoted outwardly and away from the longitudinal axis of the cart frame. A locking device (not shown) is provided to return the legs in a predetermined extended position in use. In collapsed condition, the legs of the wheel assembly are located in generally parallel alignment with the tubular frame 12 of the golf cart.

Referring particularly to FIG. 1, a golf bag, designated 50, which is formed with a conventional reinforced open top portion 52, a hand grip 54 and a reinforced bottom portion 56, is shown in connected relation with respect to the golf cart 10. The reinforced top and bottom portions 52 and 56, respectively, of the golf bag are designed to cooperate in producing a bag shape, which when viewed in a plan view, will have a generally rectangular configuration with rounded edges, which is typical of the conventional golf bag. While FIG. 1 illustrates a golf bag which is connected to the golf cart 10 across one of the shorter rectangular bag walls, where desired, the securement of the bag to the cart can be accomplished across one of the longer rectangular walls of the bag.

The apparatus or lower connector assembly for connecting the bottom bag portion 56 to the tubular frame 12 of the golf cart 10 is generally designated 60 in FIG. 1. As can be seen in both FIGS. 1 and 2, this lower connector assembly 60 includes a loop member 62 which is rigidly connected to the bottom bag portion 56 and projects outwardly therefrom. The loop member 62, as can be best seen in FIG. 2, is formed with a generally rectangular configuration, as seen in the plan view of FIG. 2. This loop member is designed to be positioned within a recess 64 formed in base member 66, best observed in FIG. 3. The base member 66 comprises a T-shaped plate which is welded to the lower extremity of bottom portion 14 of the tubular cart frame. This T-shaped plate or base member 66 projects from the tubular frame in a substantially radial direction. While the base member 66 could be formed as a relatively narrow rectangular plate extending radially outwardly from the extremity of tubular frame 12 with a transverse groove, such as 64, formed in the projecting portion thereof, the adoption and use of the T-shaped configuration is preferred to enhance bag stability and to minimize bag movement relative to the frame during use. It is preferred, in utilizing the T-shaped configuration to form the transverse recess 64 in the longer leg 68 to provide a greater loop engaging and supporting section. In the preferred embodiment of the invention, the leg 68 of the base member 66 is made approximately the same size as the width of the bag which is to be supported upon the golf cart 10.

As can be best seen in FIG. 3, the tolerance between the walls of recess 64 and the periphery of loop member 62 should be close to minimize any movement or rattling of this portion of the bag with respect to base member 66. It is also desired to provide a recess which has a sufficient depth to fully contain the segment of loop member 62 disposed therein to minimize any change of the loop member from being dislodged from the recess when the cart is roughly treated or transported across particularly rugged terrain.

Once the loop member 62, which is connected to the reinforced bottom end of the bag, has been properly nested within the recess 64 formed in T-shaped plate or base member 66 in a manner such that the lower portion of the bag 50 is supported thereby, the reinforced open top portion 52 of golf bag 50 is connected to the golf cart by an upper connector apparatus, generally designated 70, and best seen in FIGS. 1, 4 and 5.

The upper connector apparatus 70, as shown in FIG. 1, consists of a projecting element, generally designated 72, which is secured to the reinforced portion 52 bordering the open top of the bag by a plate 74, preferably riveted to the bag by rivets 76. This plate portion as shown in FIG. 5, has a generally U-shaped plan configuration which permits the riveting of plate portion 74 to three of the bag surfaces to insure the rigid mounting thereof. The projecting element 72 includes a stem portion 78 which is designed to extend generally horizontally from the bag or perpendicular to the longitudinal axis of the bag. This stem portion 78 is designed to be inserted into an aperture 80 provided in a locking member 82 welded to the upper extremity of the tubular frame 12 of the golf cart. As can be best seen in FIG. 4, locking member 82 comprises a plate or block which is bored in a substantially radial direction with respect to the longitudinal axis of tubular frame 12 to provide aperture 80 and a channel extending therefrom into which the stem portion 78 of the projecting element 72 can be inserted.

To provide for the removable securement of stem portion 78 from the channel formed in locking member 82, a generally vertical passage 84 is bored through locking member 82 substantially along the longitudinal axis of the tubular frame 12. The stem portion 78 is similarly provided with a vertical passage 86, having approximately the same diameter as passage 84 and which is disposed in alignment with passage 84 when stem portion 78 is inserted into the channel extending through locking member 82 from aperture 80.

A pin 88 formed with an enlarged head portion 90 to facilitate gripping thereof, is inserted into aligned passages 84 and 86 and thereby rigidly maintains the position of stem portion 78 of projecting element 72 in its predetermined proper alignment with respect to the tubular frame of the golf cart. While a drop-in type pin 88 is shown in the drawing, both the stem of the pin and the channels into which it is introduced can be provided with complementing threads to provide a more positive securement where desired.

Once the lower portion of the golf bag has been properly retained and supported by the base member 66 and the top portion of the bag has been properly positioned and retained by the upper connector apparatus 70, the bag and cart assembly is ready for use. When it is desired to separate the golf bag 50 from the golf cart 10, this can be expeditiously accomplished by withdrawing pin 88 utilizing the readily gripped enlarged head 90 thereof to permit the withdrawal of the stem portion 78 of the projecting element 72 connected to the bag, thereby permitting the elevation of the loop member 68 from recess 64 of the base member 66. The bag and the cart have thereby been completely separated. When this has been accomplished, the remaining golf cart consists of merely the tubular frame with the common appended wheels and steering handle and virtually no other projections or appurtenances other than the very minor base member 66 and locking member 82. No straps or other devices are required to connect or disconnect the bag from the cart.

Various modes of carrying out the invention are contemplated as being within the scope of the following claims particularly pointing out and distinctly claiming the subject matter which is regarded as the invention.

I claim:

1. An apparatus for removably connecting a golf bag to a golf cart having an elongated bag support frame comprising a base member located on the frame adjacent a first end of the frame and being provided with an outwardly opening retainer slot, a loop member adapted to be secured to a golf bag adjacent a first end thereof and having a portion thereof disposed for insertion into the retainer slot on the bag support frame to position the bag with respect to the first end of the frame and to inhibit bag movement with respect to the frame, and locking means formed on the bag support frame adjacent a second end thereof, the locking means including a projecting element disengageable from the frame and having securement means at an extremity thereof for securement adjacent a second end of a golf bag, an aperture formed in the frame and opening therefrom, the aperture extending in a direction generally normal to the axis of the elongated bag frame, the projecting element of the locking means having a stem portion inserted in the aperture, and means for releasably retaining the stem portion within the aperture of the frame to provide for the release of the second bag from the bag support frame when it is desired to disconnect the bag from the frame.

2. The apparatus of claim 1 wherein the means for releasably retaining the stem portion of the projecting element within the frame aperture includes a passage formed in the bag support frame extending at one end into communication with the frame aperture and opening at the other end from the bag support frame, the stem portion of the projecting element being formed with a hole disposed in alignment with the passage when the stem portion is inserted into the aperture, and a pin removably inserted into the passage and the hole in the stem portion of the projecting element to releasably retain the stem portion within the aperture.

3. The apparatus of claim 1 wherein the base member on the frame adjacent a first end thereof is formed with a laterally enlarged portion, the retainer slot is formed across the laterally enlarged portions and opens outwardly therefrom, the loop member has a first portion thereof nested in the retainer slot and is provided with a second portion adapted to be rigidly secured to a golf bag.

4. The apparatus of claim 3 wherein the laterally enlarged portion of the base member has a lateral dimension substantially that of the width of the bag to be supported by the frame to provide bag stability and to inhibit rolling motion as the cart passes over rough terrain.

5. The apparatus of claim 1 wherein the loop member is secured adjacent to the bottom end of a golf bag and the securement means of the projecting element are connected to the golf bag adjacent to the top end thereof whereby the bag can be removably connected to the golf cart while minimizing movement of the bag with respect to the cart frame during use thereof.